(12) United States Patent
Tschanz

(10) Patent No.: US 7,500,398 B2
(45) Date of Patent: Mar. 10, 2009

(54) PRESTRESSING ELEMENT FOR SENSORS

(75) Inventor: Peter Tschanz, Gerlikon (CH)

(73) Assignee: Kistler Holding, AG, Winterthur (CH)

( * ) Notice: Subject to any disclaimer, the term of this patent is extended or adjusted under 35 U.S.C. 154(b) by 62 days.

(21) Appl. No.: 10/542,598

(22) PCT Filed: Jan. 16, 2004

(86) PCT No.: PCT/CH2004/000020

§ 371 (c)(1),
(2), (4) Date: Apr. 7, 2006

(87) PCT Pub. No.: WO2004/065924

PCT Pub. Date: Aug. 5, 2004

(65) Prior Publication Data

US 2006/0213277 A1    Sep. 28, 2006

(30) Foreign Application Priority Data

Jan. 17, 2003   (CH) ........................... 0065/03

(51) Int. Cl.
*G01B 5/30* (2006.01)
(52) U.S. Cl. ........................... 73/760; 73/856
(58) Field of Classification Search ........... 73/760–761, 73/856
See application file for complete search history.

(56) References Cited

U.S. PATENT DOCUMENTS

| | | | | |
|---|---|---|---|---|
| 3,982,220 A | * | 9/1976 | Rozema et al. | 338/174 |
| 4,302,978 A | * | 12/1981 | Dykmans | 73/828 |
| 4,342,233 A | | 8/1982 | Edmonson et al. | |
| 4,431,329 A | * | 2/1984 | Baitelle | 403/55 |
| 4,485,677 A | * | 12/1984 | Amelot et al. | 73/761 |
| 5,279,498 A | * | 1/1994 | Kubert et al. | 384/538 |
| 5,511,801 A | * | 4/1996 | Kanaan et al. | 279/52 |
| 5,586,851 A | * | 12/1996 | Haage | 411/10 |
| 6,065,349 A | * | 5/2000 | Edouard et al. | 73/861.18 |
| 6,078,249 A | * | 6/2000 | Slavik et al. | 338/180 |
| 6,345,014 B1 | * | 2/2002 | Edouard et al. | 367/165 |
| 6,425,212 B1 | * | 7/2002 | Lovazzano | 52/105 |
| 6,446,937 B1 | * | 9/2002 | Straw et al. | 254/425 |
| 6,879,090 B2 | * | 4/2005 | Roux et al. | 310/334 |

OTHER PUBLICATIONS

International Search Report PCT/CH2004/000020, May 21, 2004.

* cited by examiner

*Primary Examiner*—Max Noori
(74) *Attorney, Agent, or Firm*—Dority & Manning, P.A.

(57) ABSTRACT

The invention relates to a prestressing element for prestressing a measuring sensor arranged between structures or in a recess of a structure. The application and release of the prestress can only be carried out at one point by means of a key. The invention also relates to an arrangement of a plurality of prestressing elements which can be individually prestressed and released with the same tool.

17 Claims, 5 Drawing Sheets

PRESTRESSING ELEMENT FOR SENSORS

CROSS REFERENCE TO RELATED APPLICATIONS

This application claims priority from previously filed PCT application number PCT/CH2004/000020 filed on Jan 16, 2004 which claims priority from CH65/03 filed Jan 17, 2003.

STATEMENT REGARDING FEDERALLY SPONSORED RESEARCH OR DEVELOPMENT

N/A

BACKGROUND OF THE INVENTION

The invention relates to a prestressing element for the application of prestress to a measuring sensor between structures or within a recess of the structure.

Force sensors are placed under mechanical prestress for the use in many applications. Examples of such applications are measurements within mechanical structures, such as rollers or other machine elements to which a force is applied. On the one hand, such prestresses are required to keep the sensors in place and to exclude play. On the other hand, they shall ensure that the sensors are utilized in their linear measuring range even if temperature variations occur.

Prestressing elements for such purposes are already known. In EP 0433535 a measuring set-up is described having an adjustable wedge which brings the measuring element to a desired prestress by means of a screw. Two further screws which restore the wedge are used to loosen the prestress.

EP 0719405 also uses a wedge for prestressing the sensor. This wedge is integrated into the sensor. For this assembly, however, the presence of parallel surfaces is required. Also in this case, two further screws are used to release the prestress to restore the wedge.

In EP 0806643 the desired prestress is also generated by means of a screw extending through all sensors. The disadvantage of the device is that the screw extends in the direction of force flux which may lead to an error in the measurement.

What is interesting in the device, however, is the use of two sensors which are almost identical but arranged opposite to each other. A variation of the prestress caused by a temperature change generates the same variation on both sensors. Half of the difference of the values measured at each of these two sensors at each temperature corresponds to the desired value of the force acting at each sensor. A compensation of this type is important if the structure to be measured is subject to great temperature differences as for example in the case of rollers.

Another prestressing mechanism, for example the one described in DE 20119194 U1 requires a bore through the surface of the machine element, for example the roller. A destruction of the surface, however, is in many cases impossible or undesired.

Also in EP 1048370 a bore through the surface of a roller is required for the installation of the sensors.

SUMMARY

Various features and advantages of the invention will be set forth in part in the following description, or may be obvious from the description, or may be learned from practice of the invention.

It is an object of the present invention to provide a prestressing device for sensors which can also be used in non-parallel surfaces such as curvatures and which does not interrupt the force structure. The prestressing device shall also be suitable for prestressing several sensors in series wherein each sensor shall be individually prestressed and released and wherein access is only possible in an axial direction, i.e. in the direction of the series arrangement. This may be necessary if the bar is to be introduced into a bore, for example that of a roller.

Another object of the present invention is the need to provide a sensor having a prestressing device which can be mounted into a machine element without having to bore through the surface of the machine element.

This object has been achieved by means of the characterizing part of the first claim.

These and other features, aspects and advantages of the present invention will become better understood with reference to the following description and appended claims. The accompanying drawings, which are incorporated in and constitute part of the specification, illustrate embodiments of the invention, and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

The invention will be explained referring to the following Figures. The Figures show.

DETAILED DESCRIPTION OF REPRESENTATIVE EMBODIMENTS

Figure 1A:
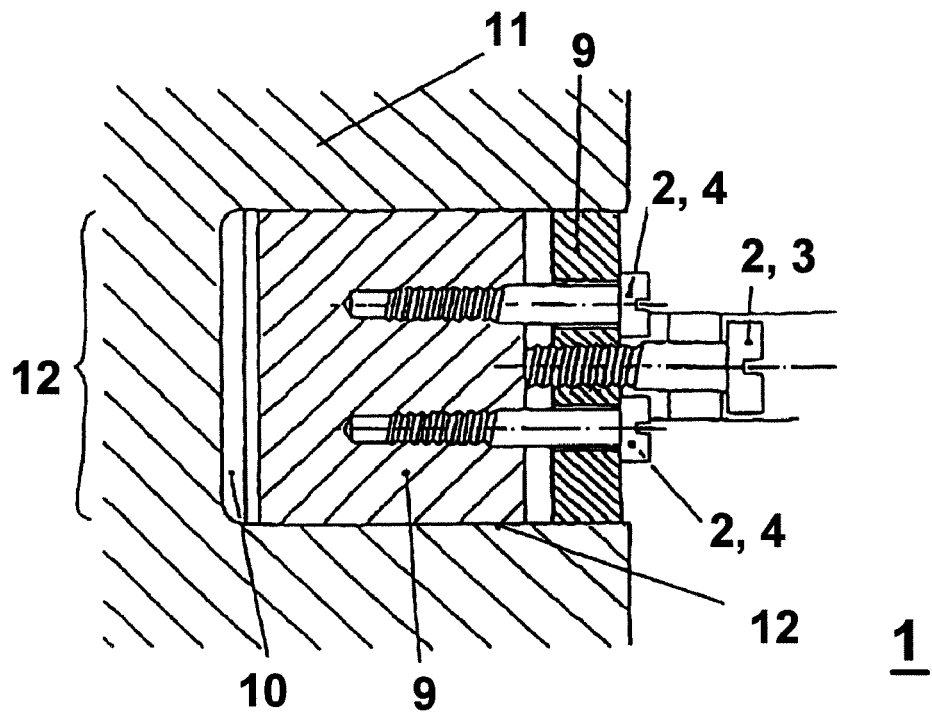
FIG. 1 the state of the art in
    a top view
    b side view
  FIG. 2 an embodiment of a prestressing device according to the invention for a sensor in
    a side view
    b frontal view
  FIG. 3 another application example of a prestressing device according to the invention in top view
  FIG. 4 another embodiment of a prestressing device according to the invention in top view
  FIG. 5 schematic drawings of different alternative variations
  FIG. 6 an embodiment according to the invention of an assembly of several sensors on a bar in a perspective view
  FIG. 7 a mounting set-up of an assembly of several sensors on a bar in a perspective view
  FIG. 8 a transversal cut of a mounting set-up Of several sensor bars in a roller
  FIG. 9 a longitudinal cut of another application example of a prestressing device according to the invention

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 1B:
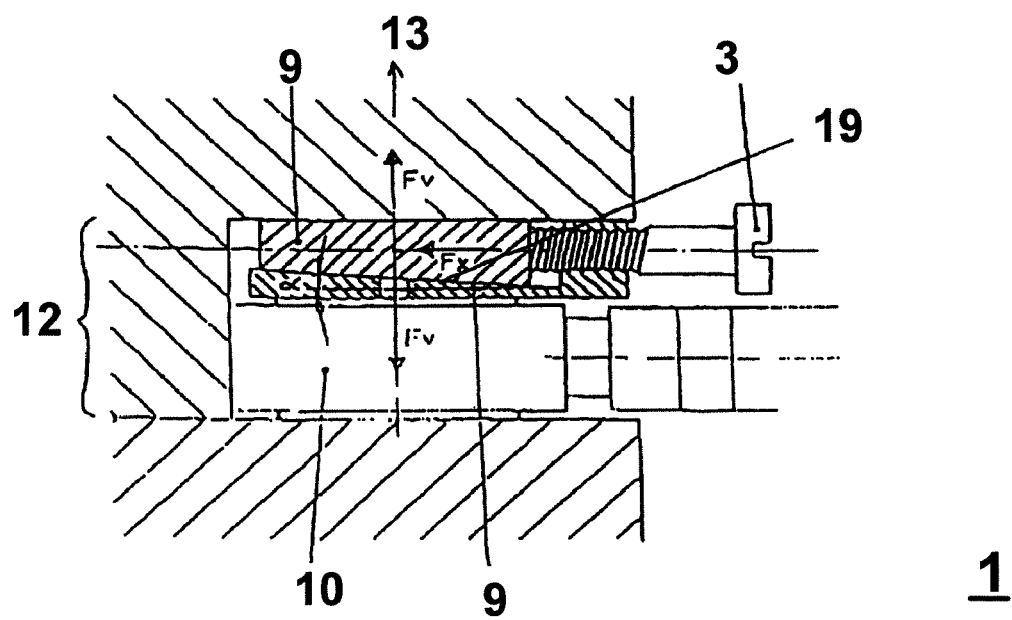

The state of the art is shown in FIG. 1. A sensor 10 is introduced under prestress into a recess 12 of machine element 11. This prestressing device 1 essentially consists of two wedges 9 of the same angle one of which is connected to the sensor 10 while the other is arranged opposite to the first and fills the remaining space between the first wedge and the inner edge of the recess 12. A screw means 2 enables a displacement of the two wedges 9 on their inclined surfaces 19 towards each other by which the space which the wedges 9 occupy in the prestressing device 13 is altered. Thus, by operating a central screw 3 the sensor 10 can be set under prestress; the prestress can again be released by two further screws 4 fixed laterally with respect to the first screw 3.

Figure 2A:
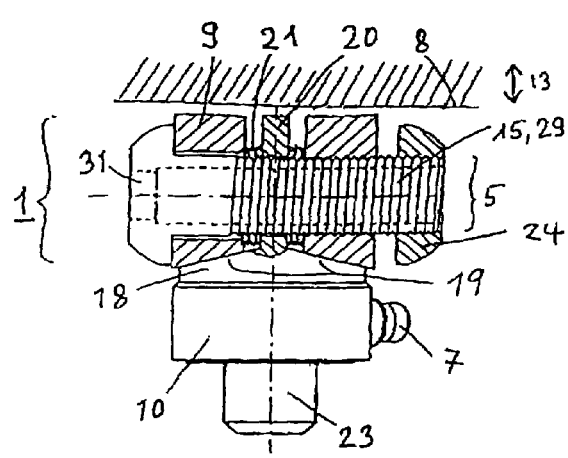
Figure 2B:
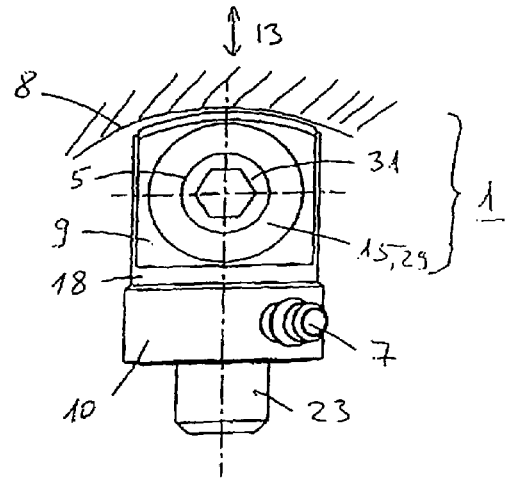

FIG. 2 shows an application example according to the invention of a prestressing element 1 having a sensor 10 in two different perspectives. In this respect, the sensor 10 can be integrated into the prestressing element 1 or can be connected thereto in a separable manner. The prestressing element 1 comprises a base 18 having at least one, preferably two, wedge surfaces 19 and a holding plate 20 firmly connected with the base 18. Furthermore, the sensor 10 can be provided with a bolt 23 which enables introduction into an appropriate bore. The sensor 10 has a plug for the connection of a cable for signal recording.

Arranged on each of the wedge surfaces 19 of the base 18 is a clamping element 9 having a surface parallel to the holding plate 20 and a surface inclined to the same extent as the wedge surface 19 in the direction of the base 18. The edge of the wedge elements 9 facing in the direction of the machine element 8 can, advantageously at least partially, have any form of the recess into which the prestressing element 1 shall be introduced, particularly flat of in the form of a segment of a circle.

Both the holding plate 20 and the clamping elements 9 have an essentially central bore 5 through which a straining screw 15 is introduced.

This straining screw 15 must extend at least until into the second clamping element 9. If the bore in the second clamping element 9 is a through bore, the straining screw 15 may pass through the latter and may preferably be fixed by means of a nut 24 serving as a stopper to prevent removal of the straining screw 15. At least one, preferably two spring elements 21 each generate a back pressure from the holding plate 20 to each clamping element 9. By tightening the straining screw 15, each clamping element 9 is shifted along the wedge surface 19 against the holding plate 20 and against the surface of the machine element 8. In the mounted state this generates a pressure onto the surface of the machine element 8 and also to the same extent onto the sensor 10. If the screws are released, the spring elements 21 ensure that the clamping elements 9 are released along the wedge surfaces 19.

Figure 3:
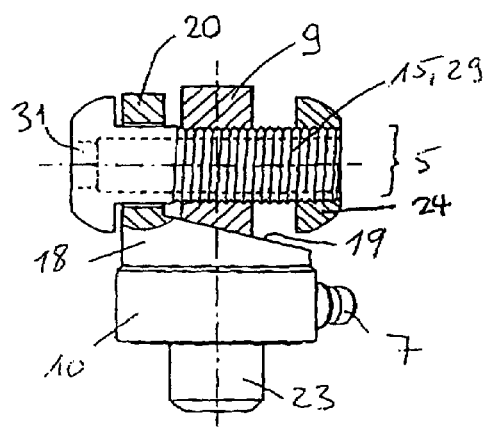

FIG. 3 describes an alternative embodiment of a prestressing element according to the invention having a base 18 with only one wedge surface 19. A holding plate 20 must be firmly joined to the base 18 for the prestress to be applied.

In this embodiment only one clamping element 9 is present which can be tightened against the holding plate 20 by means of a straining screw 15. The straining screw 15 may end in the clamping element 9 as in the prestressing device 2 in FIG. 1 or, if the bore in the holding plate 20 is a through bore, may pass through the latter. In this case a nut 24 could be fixed to the end of the straining screw 15. If the prestress is released, the static friction of the clamping element 9 can be overcome for example by a knock onto the straining screw 15.

FIG. 4 again shows a prestressing element 1 having two clamping elements 9. In this application example, the two clamping elements 9 have opposed threads, namely a left-handed thread 26 and a right-handed thread 27. Also by this arrangement the prestress can be applied and released without a spring element having to be present. In the area of the holding plate 20 a means 28 is provided which inhibits a translational movement of the straining screw 15.

Figure 4:
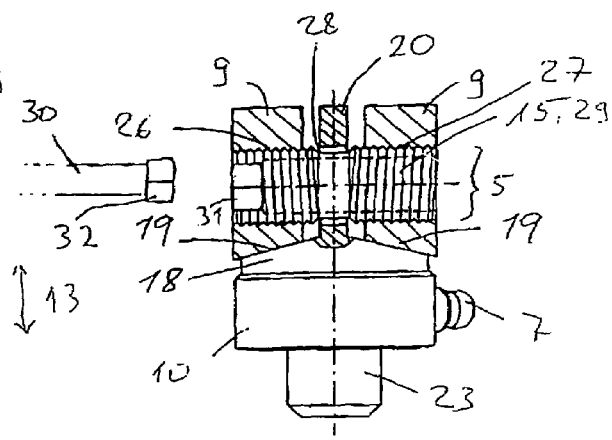

The same straining screw 15 as drawn in FIG. 4 which is characterized by a left-handed thread 26 and a right-handed thread 27 can also be used in an embodiment according to FIG. 3. The left-handed thread 26 engages a corresponding thread in the area of the holding plate 20 while the right-handed thread 27 engages the thread of the clamping element 9. Also, in this application example a means 28 to prevent translation of the straining screw 15 is not necessary.

It is common to all examples of the FIGS. 2 to 4 that the prestress can be applied and released at a single site at the prestressing element 1 and that this operation requires access from only one direction. This direction extends transversally to the direction of prestress 13.

This entails the advantage that the surface of the machine element 8 must not be broken to operate (stress or loosen) the prestressing element introduced therein. Another advantage is that operation is also ensured if the prestressing element 1 is not directly placed at the opening of the recess 12 but far within a long opening of the machine element 11. This position would enable access from only one direction.

Also common to these application examples of the FIGS. 2 to 4 in which all clamping elements 9 have through bores is the possibility to use a hollow screw 29 as the straining screw 15. According to the invention, this hollow screw 29 at least partially has an internal engaging means 31 for a tool 30, for example for an internal hexagon socket screw key. The portion of the hollow screw 29 which is not provided with this engaging means 31 must have an internal opening of a least a size that a tool 30 having at its end a structure 32 complementary to the engaging means 31 can pass through the hollow screw 29.

As shown in FIG. 5, alternative embodiments may easily be envisaged which also bear the feature that the prestressing is applied and released only by a straining screw 15 and that this movement occurs form only one direction extending transversally to the direction of prestress 13. As shown in FIGS. 5a and 5b, the prestressing may be for example occur due to a spindle nut 16. FIG. 5c shows a shear system 17. This principle is known in the form of a screw jack. FIG. 5d shows the principle of an expanding cone. With all of these principles prestressing elements may be built which also apply or release a prestress only by means of a screw wherein the access to carry out this motion occurs from a single direction extending transversally to the direction of prestress 13. Alternative mechanisms further are hydraulic systems or systems by means of piezoactuators.

Figure 5A:
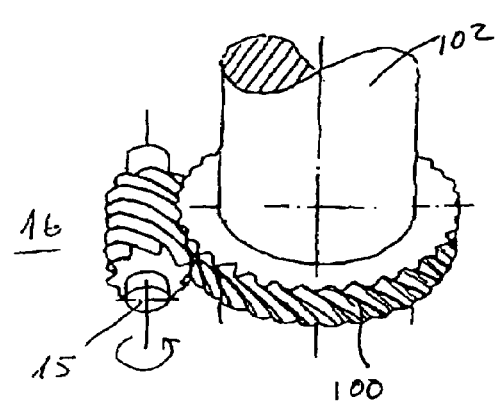
Figure 5B:
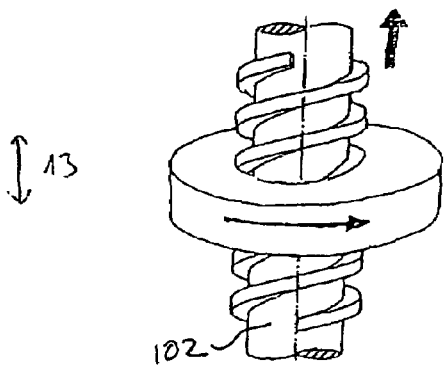
Figure 5C:
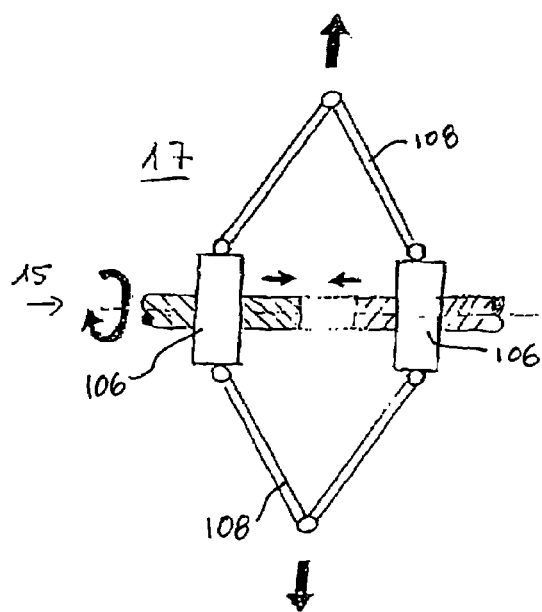
Figure 5D:
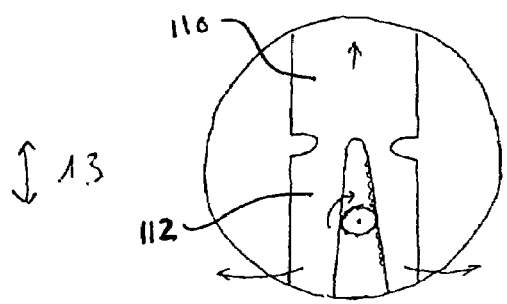

In FIG. 5a, the straining screw 15 includes a spindle nut 16 that meshes with a driven member that includes a gear 100. As such, rotation of the spindle nut 16 will cause a corresponding rotation of the gear 100 about an axis that is transverse to the axis of the spindle nut 16. As shown in FIG. 5b, the gear 100 has internal threadings that mesh with external threadings on a shaft 102. Rotation of the gear 100 thus causes the shaft 102 to move in the direction of prestress 13. In FIG. 5c, a shear system 17 is shown that includes a driven member incorporating a pair of housings 106. The straining screw 15 has both left handed and right handed threading thereon. Rotation of the straining screw 15 thus causes the housings 106 to move towards and away from one another depending upon the direction of rotation of the straining screw 15. The housings 106 are in pivotable engagement with linkages 108. Movement of the housings 106 towards one another causes the linkages 108 to move so as to prestress the sensor 10. Movement of the housing 106 away from one another causes the release of the prestress force by the linkages 108. FIG. 5d includes a driven member 110 that incorporates an expanding cone 112. The straining screw 15 engages threading in the expanding cone 112 such that rotation of the straining screw 15 causes movement of the driven member 110 in the direction of prestress 13.

Figure 6:
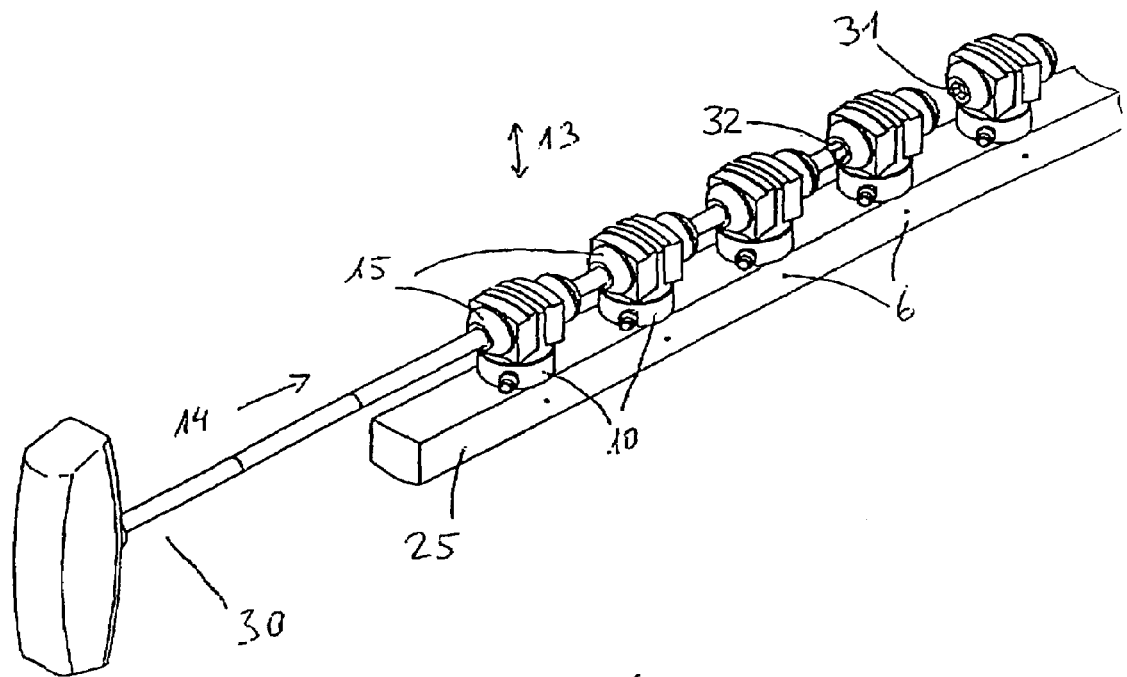

A further application is shown in FIG. 6. In this embodiment one or more sensors 10 are mounted on a suitable bar 25, for example by means of the bolts 23 in bores provided for this purpose. Additionally, the bolts 23 can be fixed from the side of the bar by means of a small attachment screw 6. The cables of the individual sensors can be laid tied up in bundles to the sides of the sensors (not shown).

For this assembly it is advantageous if all straining screws 15 have central through bores and at least partially have an engaging means 31 for a tool. An appropriate tool 30 has at its end a structure 32 corresponding to the engaging means 31, for example for a hexagon socket screw key. As a whole the fitting must not be larger than the through bore. The key 30, for example a hexagon socket screw key of at least the length of the bar 25 with the sensors 10 placed thereon and having a suitable torque resistance, can be passed through all sensors 10. The key 30 operates all sensors from a single direction of access 14 transversal to the direction of prestress 13.

Figure 7:
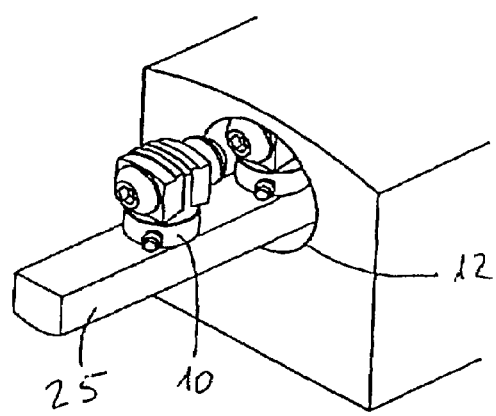

FIG. 7 shows a bar 25 with the sensors placed thereon according to the invention during installation. The bar 25 with the sensors 10 placed thereon and having the key 30 can be introduced into a recess 12 of a suitable form. For the application of a prestress, the hindmost sensor 10 is tightened first by means of the key 30. By pulling out the key in each case by the spacing between two adjacent sensors 20 the next straining screw 15 can be reached and tightened until all sensors 10 have been prestressed. A corresponding marking on the key with the spacing of the sensors 10 will be helpful.

A roller can be provided with several of theses bars from both faces so that a key 30 will be sufficient which is of only half of the length of a roller. Experience has revealed good results with keys having a length of up to 1.5 m with a screw size of 6-8 mm. For longer keys the screws have to be enlarged correspondingly to achieve the desired torque resistance of the key.

Figure 8:
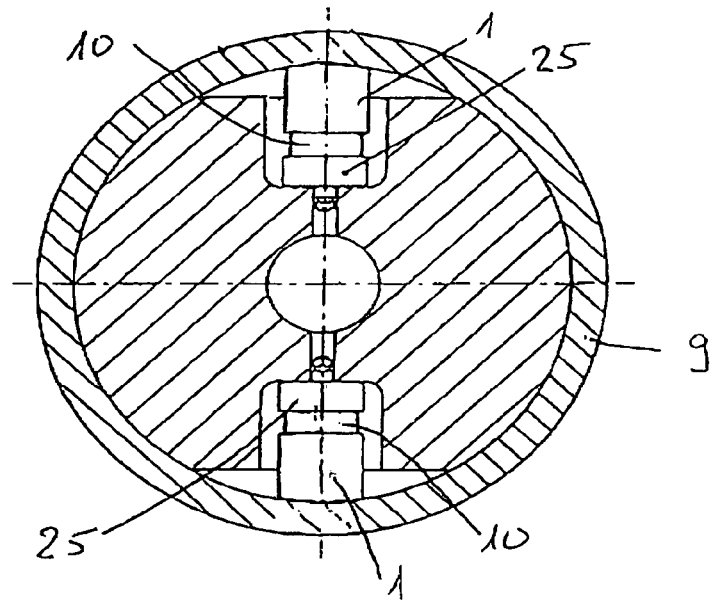

As shown in FIG. 8, a machine element 9, for example a roller, can be provided with the bars 25 with sensors placed thereon which are placed exactly opposite to each other. In this arrangement, every two opposite sensors 10 can be evaluated together in order to compensate for temperature-caused variations in the prestress. For this purpose the pairs of sensors are mounted facing in opposite directions.

In contrast to having only one clamping wedge as in the state of the art it is an additional advantage of a tightening component having two clamping elements that no shearing force is exerted on the sensor because the frictional forces arising during the prestressing operation act symmetrically against each other and do not cause a resulting component in axial direction. Another advantage in the embodiment according to the invention is the handling of the stressing and releasing of the individual sensors for which only a single centrally operable key is required.

Another advantage of this invention is that the sensors can be tightened in a built-in state. In the case of so-called "weight in motion" or WIM sensors which measure the weight of vehicles passing on the roads and are built into the roads, for example, the sensors are prestressed before the bar with the sensors placed thereon is installed. However, this is impossible for many applications.

Modifications of this device can be easily found. Thus, the straining screw 15 can be for example fixed in the hindmost clamping element in a rotating, but tension- and compression-proof manner and can be adjusted in the foremost clamping element by means of an internal thread. The key fitting can extend over a portion of the straining screw or over its entire length. This arrangement has no spring since the clamping portions are also screwed to each other in a compression-proof manner. On the other hand, a means 28 to prevent a translational movement of the straining screw 15 is advantageous. Such arrangements also ensure release of the prestress even if this has tightened over time, for example by corrosion due to long term environmental effect. The structure 32 at the end of the key can engage the engaging means 31 from both sides by placing the key between two appropriate positions. Thereby by pressure or traction an additional force may be applied to the straining screw 15 for loosening the clamping elements 9.

Further modifications can be easily envisaged. The examples mentioned herein shall be in no way construed as limiting.

Figure 9:
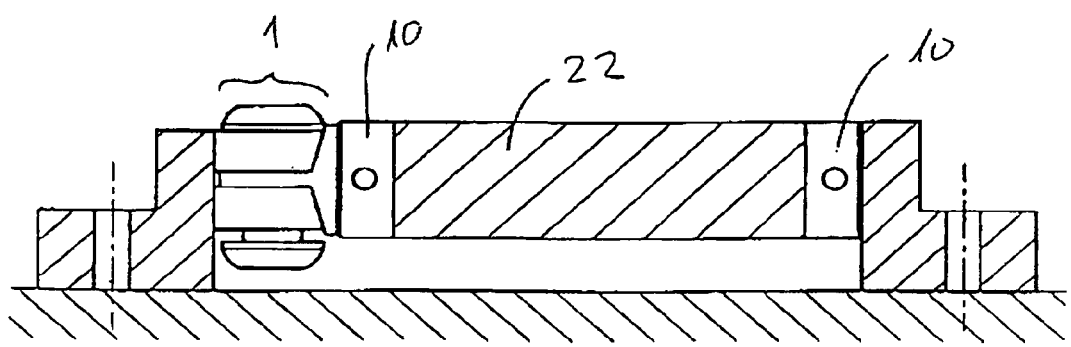

In the arrangement of FIG. 9 two sensors 10 are tightened on both sides of a base plate 22, a clamping plate or a work piece by means of a prestressing element 1 according to the invention. It has to be noted that only one prestressing element 1 is used to prestress two sensors 10. If the two sensors 10 are mounted in opposite directions alterations in the prestress as a function of temperature can be compensated for.

Besides force sensors, also sensors for the measurement of pressure and/or moments can be used as the sensors which have to be placed under prestress.

LIST OF NAMES 1. prestressing element
2. screw means
3. central screw for straining the wedge
4. screws to release the wedge
5. central bore
6. lateral clamping screw
7. plug
8. surface of the machine element
9. clamping element, wedge
10. sensor
11. structure, machine element
12. recess
13. direction of prestress
14. direction of access (direction transversal to the direction of prestress)
15. straining screw
16. spindle nut
17. shear system
18. base
19. wedge surface, wedge-shaped plane
20. holding plate
21. spring element
22. base plate or working piece
23. bolt
24. nut
25. bar (rail)
26. left-handed thread
27. right-handed thread
28. means to prevent translation, stopper
29. hollow screw
30. key (tool)
31. engaging means
32. structure corresponding to the engaging means It should be understood that the present invention includes various modifications that can be made to the embodiments of the prestressing element 1 and assembly described herein as come within the scope of the appended claims and their equivalents.

The invention claimed is:

1. A prestressing element for application and release of prestress to a sensor, comprising:
   a base having at least one wedge surface;
   a clamping element having an inclined surface in mating engagement with said wedge surface of said base; and
   a screw disposed through said clamping element, said screw having an axial direction, wherein rotation of said screw in a first direction urges said inclined surface of said clamping element against said wedge surface of said base such that said base is urged in a direction transverse to said axial direction of said screw;
   wherein said base is configured such that urging of said base in said transverse direction causes prestress on the sensor, and wherein rotation of said screw in an opposite direction from said first direction ensures release of the prestress on the sensor due to long term environmental effect.

2. The prestressing element as set forth in claim 1, further comprising at least one holding plate connected to said base, and wherein said screw is disposed through said holding plate.

3. A prestressing element for application and release of prestress to a sensor, comprising:
   a base having at least one wedge surface;
   a clamping element having an inclined surface in mating engagement with said wedge surface of said base;
   a screw disposed through said clamping element, said screw having an axial direction, wherein rotation of said screw in a first direction urges said inclined surface of said clamping element against said wedge surface of said base such that said base is urged in a direction transverse to said axial direction of said screw; and
   a spring element disposed against said clamping element, wherein said base is configured such that urging of said base in said transverse direction causes prestress on a sensor, and wherein rotation of said screw in an opposite direction from said first direction causes release of the prestress on the sensor and wherein said spring element applies a force in said axial direction of said screw against said clamping element so as to aid in releasing prestress on the sensor.

4. The prestressing element as set forth in claim 1, wherein said base has a pair of wedge shaped surfaces, and wherein a pair of clamping elements are present and each have an inclined surface, and wherein each one of said wedge shaped surfaces mates with one of said inclined surfaces of said clamping elements.

5. A prestressing element for application and release of prestress to a sensor, comprising:
   a base having a pair of wedge shaped surfaces;
   a pair of clamping elements, each said clamping element having an inclined surface in mating engagement with a different one of said wedge shaped surfaces of said base;
   a screw disposed through said clamping elements, said screw having an axial direction, wherein rotation of said screw in a first direction urges said inclined surfaces of said clamping elements against said wedge shaped surfaces of said base such that said base is urged in a direction transverse to said axial direction of said screw;
   wherein said screw has right-handed threading engaging one of said clamping elements, and wherein said screw has left-handed threading engaging the other one of said clamping elements, and wherein movement of said screw in said axial direction is prevented; and
   wherein said base is configured such that urging of said base in said transverse direction causes prestress on a sensor, and wherein rotation of said screw in an opposite direction from said first direction causes release of the prestress on the sensor.

6. The prestressing element as set forth in claim 1, wherein said base is integrally formed with the sensor.

7. The prestressing element as set forth in claim 1, wherein said screw is a hollow screw having an inner surface configured for engaging a tool such that rotation of said tool against said inner surface causes rotation of said screw.

8. A prestressing element for application and release of prestress to a sensor, comprising:
   a screw having an axial direction and having threading disposed thereon;
   a driven member in threaded engagement with said screw, wherein rotation of said screw in a first direction causes said driven member to be urged in a direction transverse to said axial direction of said screw so as to apply prestress to a sensor;
   wherein rotation of said screw in an opposite direction from said first direction causes said driven member to be urged the direction transverse to said axial direction of said screw so as to release prestress to the sensor, and wherein application of prestress and release of prestress is effected through rotation of said screw in opposite directions.

9. The prestressing element as set forth in claim 8, wherein:
   said screw is a spindle nut; and
   said driven member includes a gear in threaded engagement with said spindle nut such that rotation of said spindle nut causes rotation of said gear, and wherein said driven member includes a shaft in threaded engagement with said gear such that rotation of said gear causes movement of said shaft in the direction transverse to said axial direction of said screw so as to apply prestress to a sensor.

10. A prestressing element for application and release of prestress to a sensor, comprising:
    a screw having an axial direction and having threading disposed thereon;
    a driven member in threaded engagement with said screw, wherein rotation of said screw in a first direction causes said driven member to be urged in a direction transverse to said axial direction of said screw so as to apply prestress to a sensor;
    wherein rotation of said screw in an opposite direction from said first direction causes said driven member to be urged the direction transverse to said axial direction of said screw so as to release prestress to the sensor, and wherein application of prestress and release of prestress is effected through rotation of said screw in opposite directions; and
    wherein said driven member includes a pair of housings in threaded engagement with said screw, wherein rotation of said screw causes said housings to move in the axial direction of said screw, and wherein said driven member includes a linkage pivotally attached to said housings such that movement of said housings causes said linkage to be urged in the direction transverse to said axial direction of said screw.

11. The prestressing element as set forth in claim 10, wherein said screw has both right handed threading and left handed threading.

12. The prestressing element as set forth in claim 8, wherein said driven member includes an expanding cone in threaded engagement with said screw, and wherein rotation of said screw causes said driven member to be urged in the direction transverse to said axial direction of said screw.

13. A plurality of prestressing elements for application and release of prestress to sensors, at least two of said prestressing elements each comprising:
- a base having at least one wedge surface;
- a clamping element having an inclined surface in mating engagement with said wedge surface of said base; and
- a screw disposed through said clamping element, said screw having an axis with an axial direction, wherein rotation of said screw in a first direction urges said inclined surface of said clamping element against said wedge surface of said base such that said base is urged in a direction transverse to said axial direction of said screw;
- wherein said base is configured such that urging of said base in said transverse direction causes prestress on a sensor, and wherein rotation of said screw in an opposite direction from said first direction causes release of the prestress on the sensor; wherein said axes of said screws are aligned with one another.

14. The plurality of prestressing elements as set forth in claim 13, further comprising a plurality of sensors mounted onto a bar, and wherein said bases are mounted to said sensors.

15. The plurality of prestressing elements as set forth in claim 13, wherein said screws are hollow and have an inner surface configured for engaging a tool such that rotation of said tool against said inner surface causes rotation of said screw.

16. The plurality of prestressing elements as set forth in claim 13, further comprising a plurality of bars and a plurality of oppositely disposed sensors mounted onto said bars, wherein said bases are mounted to said sensors, and wherein every two of said sensors arranged opposite to one another compensate for a prestress variation.

17. The plurality of prestressing elements as set forth in claim 13, wherein said bases are integrally formed with the sensors.

\* \* \* \* \*